United States Patent
Weng et al.

(10) Patent No.: US 7,249,275 B2
(45) Date of Patent: Jul. 24, 2007

(54) CLOCK GENERATING DEVICE AND METHOD FOR EXECUTING OVERCLOCKING OPERATION

(75) Inventors: Wen-Shiung Weng, Sindian (TW); Chi-Kung Kuan, Dasi Township, Taoyuan County (TW); Sheng-Kai Chen, Shetou Township, Changhua County (TW); Ming-Chun Chang, Chiayi (TW); Yi-Shu Chang, Tainan (TW)

(73) Assignee: Realtek Semiconductor Corp., HsinChu (TW)

( * ) Notice: Subject to any disclaimer, the term of this patent is extended or adjusted under 35 U.S.C. 154(b) by 354 days.

(21) Appl. No.: 10/933,896

(22) Filed: Sep. 3, 2004

(65) Prior Publication Data

US 2005/0055597 A1    Mar. 10, 2005

(30) Foreign Application Priority Data

Sep. 5, 2003   (TW) ................................ 092124670

(51) Int. Cl.
  *G06F 1/10* (2006.01)
(52) U.S. Cl. ............................ 713/501; 713/503; 327/8
(58) Field of Classification Search ...................... None
  See application file for complete search history.

(56) References Cited

U.S. PATENT DOCUMENTS

| | | | | |
|---|---|---|---|---|
| 5,455,931 A | * | 10/1995 | Camporese et al. | 713/501 |
| 5,592,632 A | * | 1/1997 | Leung et al. | 710/316 |
| 6,535,986 B1 | * | 3/2003 | Rosno et al. | 713/400 |
| 6,622,254 B1 | * | 9/2003 | Kao | 713/500 |
| 6,665,808 B1 | * | 12/2003 | Schinzel | 713/501 |
| 6,952,790 B2 | * | 10/2005 | Ramanathan et al. | 713/401 |
| 6,963,992 B1 | * | 11/2005 | Cheng et al. | 713/501 |

* cited by examiner

*Primary Examiner*—Thuan Du
(74) *Attorney, Agent, or Firm*—Winston Hsu

(57) ABSTRACT

A clock tuning device and method for executing overclocking operations on plural elements disposed on a motherboard. The clock tuning device includes a phase-locked loop for outputting a plurality of clock signals to the elements, and a control circuit for controlling the phase-locked loop to adjust the frequencies of the clock signals, so as to execute the overclocking operations on the elements, respectively. The method includes the steps of: increasing the frequency of a first clock signal until one of the elements can't work normally due to an utmost frequency of the first clock signal; resetting all the elements and operating the element corresponding to the first signal according to a safe frequency of the first clock signal; and repeating the above steps to perform overclocking operation on each of the other elements.

20 Claims, 4 Drawing Sheets

CLOCK GENERATING DEVICE AND METHOD FOR EXECUTING OVERCLOCKING OPERATION

This application claims the benefit of Taiwan application Serial No. 092124670, filed on Sep. 5, 2003, which is incorporated herein by reference.

BACKGROUND OF THE INVENTION

1. Field of the Invention

The invention relates to a clock generator, and more particularly to a device and the method thereof for respectively tuning frequencies of a plurality of clock signals generated by a clock generator.

2. Description of the Related Art

In general, a conventional PC (Personal Computer) has a clock chip for providing various clock signals for elements disposed on a motherboard, such as a CPU (Central Processor Unit), peripheral chips, and buses. Because the tolerance of the working frequency of these chips and buses have been taken into account in the design stage, overclocking operations may be executed by the clock chip on these elements, so as to increase the working frequencies of the elements and thus the system's efficiency are enhanced.

FIG. 1 is an architecture diagram showing chips disposed on a motherboard. These chips comprise a CPU 110, a north bridge chip 120, a south bridge chip 130 and a clock chip 140. When the overclocking operation is to be executed by the clock chip, a watchdog timer 141 inside the clock chip 140 is first set. Next, the watchdog timer 141 is enabled, and then the following overclocking operation is executed. The clock chip 140 increases the frequency of a clock signal and then outputs the clock signal to the element corresponding to the clock signal. Consequently, the system of the motherboard will be checked to determine whether the system of the motherboard works normally or not after increasing the frequency of the clock signal.

For example, the clock chip 140 increases the frequency of the clock signal (CPU_CLK) provided for the CPU 110 from 100 MHz to 101 MHz, and then the CPU 110 is operated according to the CPU_CLK. Meanwhile, the CPU 110 executes a BIOS (Basic Input/Output System) program and thus the south bridge chip 130 generates the SCLK and SDATA signals to reset the watchdog timer 141. If the CPU is workable according to the frequency (101 MHz) of CPU_CLK, the watchdog timer 141 can be reset before it generates an interrupt signal. Furthermore, the clock chip 140 sets the frequency (101 MHz) as a safe frequency Fsafe of the CPU_CLK, and increases the frequency of the CPU_CLK from 101 MHz to 102 MHz.

If the CPU 110 is unworkable according to the frequency (102 MHz) of the CPU_CLK, the CPU 110 cannot execute the BIOS program and thus the south bridge chip 130 cannot output the SCLK and SDATA signals to reset the watchdog timer 141. Thus, the watchdog timer 141 generates an interrupt signal and the clock chip 140 sets the frequency of the CPU_CLK equal to Fsafe (101 MHz). Then the system of the motherboard is reset.

However, the conventional clock chip 140 outputs various clock signals which correlate to one another. That is, if the overclocking operation executed on the clock signal provided for the accelerated graphics port (AGP) 121 fails, other clock signals (e.g., CPU_CLK) cannot continuously be overclocked. Hence, the overclocking range of each of the chips, buses or other elements, which operates according to the clock signal outputted from the clock chip 140, is restricted by the element having the smallest overclocking tolerance. Moreover, the timing period of resetting the watchdog timer 141 is too long so that the clock chip 140 has to spend a lot of time to perform the overclocking operation. Therefore, the overclocking method of the conventional clock chip still has some drawbacks to be overcome.

SUMMARY OF THE INVENTION

It is therefore an object of the invention to provide a clock tuning device and method capable of respectively executing overclocking operations according to various clock signals outputted from a clock chip, and of shortening the time necessary for the clock chip to execute the overclocking operation.

The invention achieves the above-identified object by providing a clock tuning method applied to a clock chip for executing an overclocking operation. The clock chip, which is disposed on a printed circuit board such as a motherboard, is for outputting a plurality of clock signals. One of the embodiment of the method including the steps of: increasing the frequency of a first clock signal; resetting the printed circuit board when the system of the printed circuit board cannot work normally, and recording the value of the frequency of the first clock signal at that time; and subtracting a default value from the value of the frequency of the first clock signal and storing the subtracted value as the working frequency of the first clock signal. The steps are repeated so that the frequency of each of the clock signals can be tuned.

The invention also achieves the above-identified object by providing a clock tuning device for executing an overclocking operation. The clock tuning device is coupled to a CPU and a south bridge chip, and the clock tuning device, the CPU and the south bridge chip are disposed on a motherboard. The clock tuning device comprises plural registers for storing values of frequencies of a plurality of clock signals, a phase-locked loop coupled to the registers for respectively outputting the clock signals, and a control circuit for adjusting the frequencies of the clock signals outputted by the phase-locked loop to execute the overclocking operations on the clock signals, respectively.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
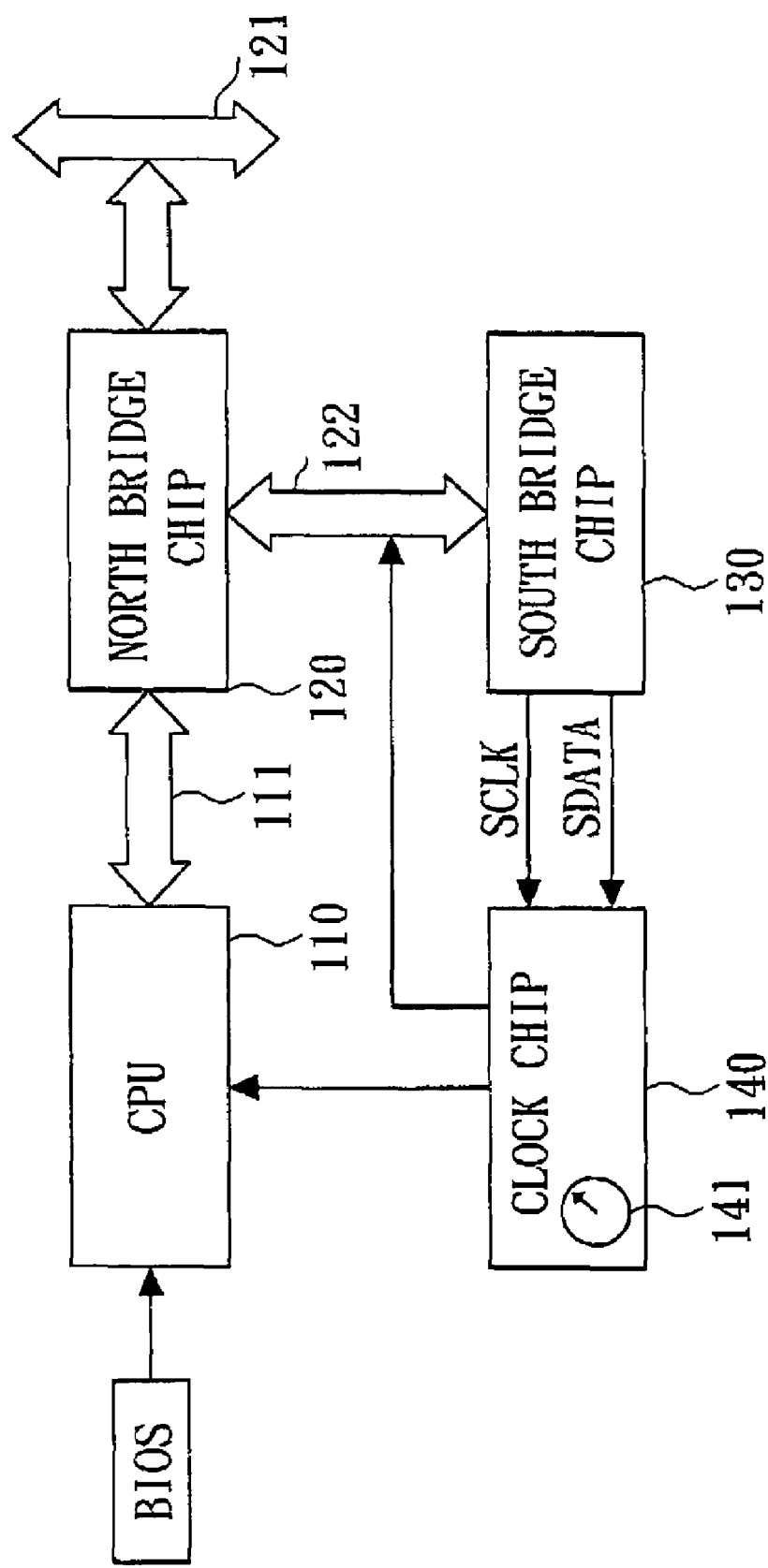
FIG. 1 is an architecture diagram showing chips including a clock tuning device disposed on a motherboard according to the prior art.
Figure 2A:
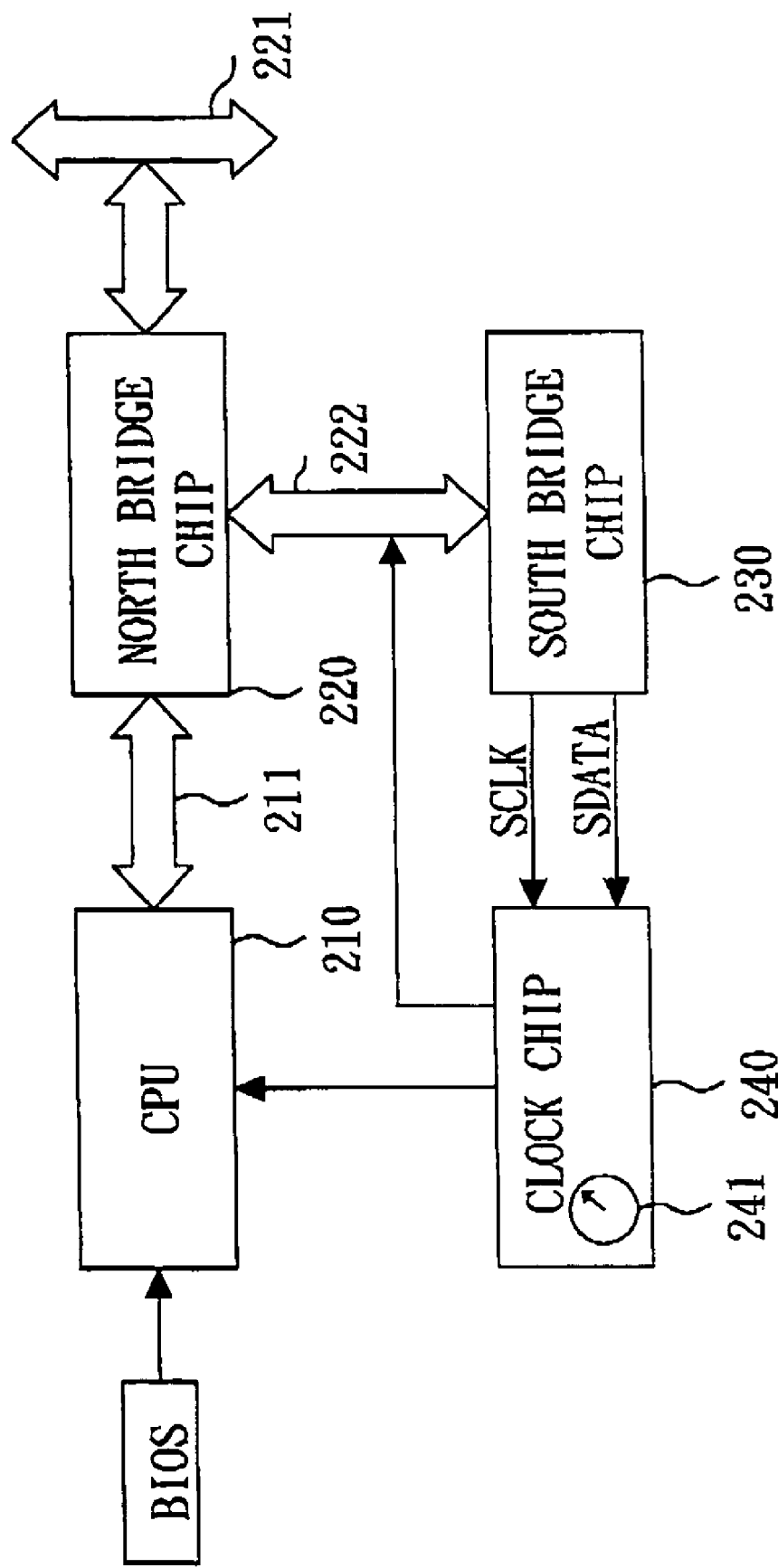
FIG. 2a is an architecture diagram showing chips including a clock tuning chip disposed on a motherboard according to an embodiment of the invention.

Please refer to FIG. 2a. FIG. 2a is an architecture diagram showing chips disposed on a motherboard, wherein the chips include a clock chip 240 of an embodiment according to the invention. In this embodiment, a CPU 210, a north bridge chip 220, a south bridge chip 230 and the clock chip 240 are disposed on the motherboard. The CPU 210 is coupled to the north bridge chip 220 through a front side bus 211. The north bridge chip 220 is coupled to the south bridge chip 230 through a bus 222, and the north bridge chip 220 is further coupled to an AGP (Accelerated Graphics Port) 221. The south bridge chip 230 accesses the clock chip 240 through a serial bus, such as SMBus (System Management Bus), which transmits signals, such as SCLK and SDATA signals.

Figure 2B:
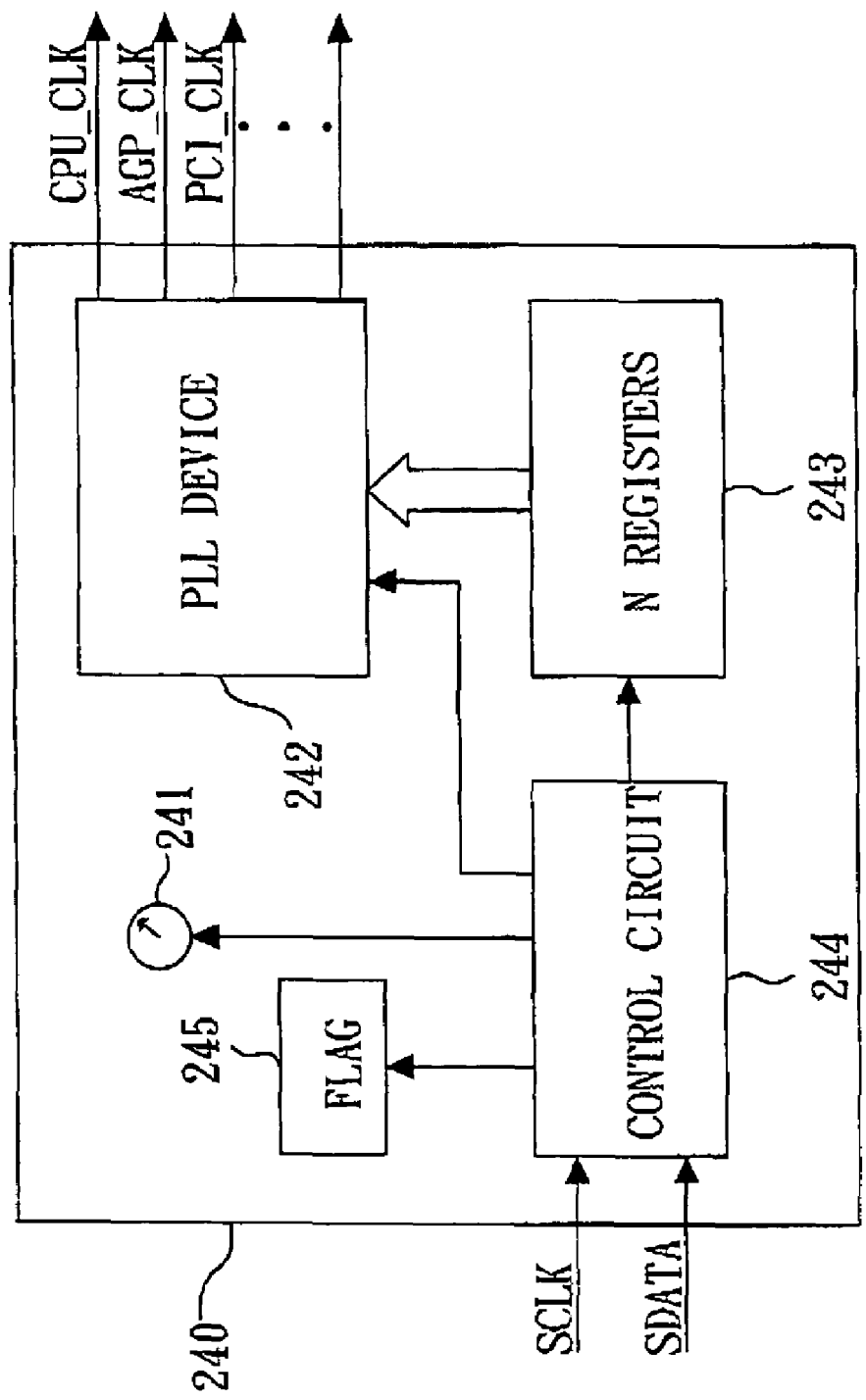
FIG. 2b is a block diagram showing the clock tuning chip of FIG. 2.

The clock chip 240 serves as a clock tuning device. FIG. 2b is a block diagram showing an embodiment of the clock chip 240, which comprises a watch dog timer 241, a PLL (Phase-Locked Loop) device 242, N registers with a 1st to N-th registers (N is a positive integer) 243, a control circuit 244, and a flag 245. The PLL device 242 is for generating N clock signals (e.g., CPU_CLK, AGP_CLK, PCI_CLK . . . ) according to the values stored in the N registers 243, so as to respectively provide clock signals for the elements such as the CPU 210, the AGP 221, and the PCI bus, etc. Each of the N registers 243 may be respectively set to store a predetermined value before a corresponding overclocking operation is executed.

The control circuit 244 executes the overclocking operations by adjusting the values stored in the N registers 243. The watch dog timer 241 provides a timer function, and the south bridge chip 230 can access the flag 245 and the watch dog timer 241 by generating the signals such as SCLK and SDATA signals.

When the clock chip 240 performs overclocking operation on one of the elements, the flag 245 is set to 0. When the clock chip 240 finishes the overclocking operation, the flag 245 is set to 1. Therefore, when the overclocking operation is executing, the CPU 210 may execute a BIOS program to read the flag 245 of the clock chip 240 through the north bridge chip 220, the south bridge chip 230 and the serial bus (SMBus). If the flag 245 is 0, it means that the overclocking operation has not been finished, and the BIOS program continuously reads the flag 245. At this time, the signals (SCLK and SDATA signals) are transmitted continuously on the serial bus. If the flag 245 is 1, it means that the overclocking operation has been finished, and the BIOS program stops reading the flag 245. Accordingly, if one of the elements (for example, the CPU 220) disposed on the motherboard cannot work normally during performing the overclocking operation, the south bridge chip 230 will fail to generate the signals to read the flag 245. Hence, the clock chip 240 is able to determine whether the elements works normally or not by detecting the existence of the signals generated by the south bridge chip 230 when the flag 245 is 0.

The described embodiment may utilize the BIOS program to access the flag 245 of the clock chip 240 through the south bridge chip 230 and the serial bus, so that the clock chip 240 can determine whether the overclock operation is successful or not by detecting the signals generated by the south bridge chip 230. In another embodiment of the invention, the BIOS program can access the watchdog timer 241 of the clock chip 240 through the south bridge chip 230 and the serial bus, so that the clock chip 240 can determine whether one of the elements disposed on the motherboard works normally or not by detecting the signals generated by the south bridge chip 230.

Figure 3:
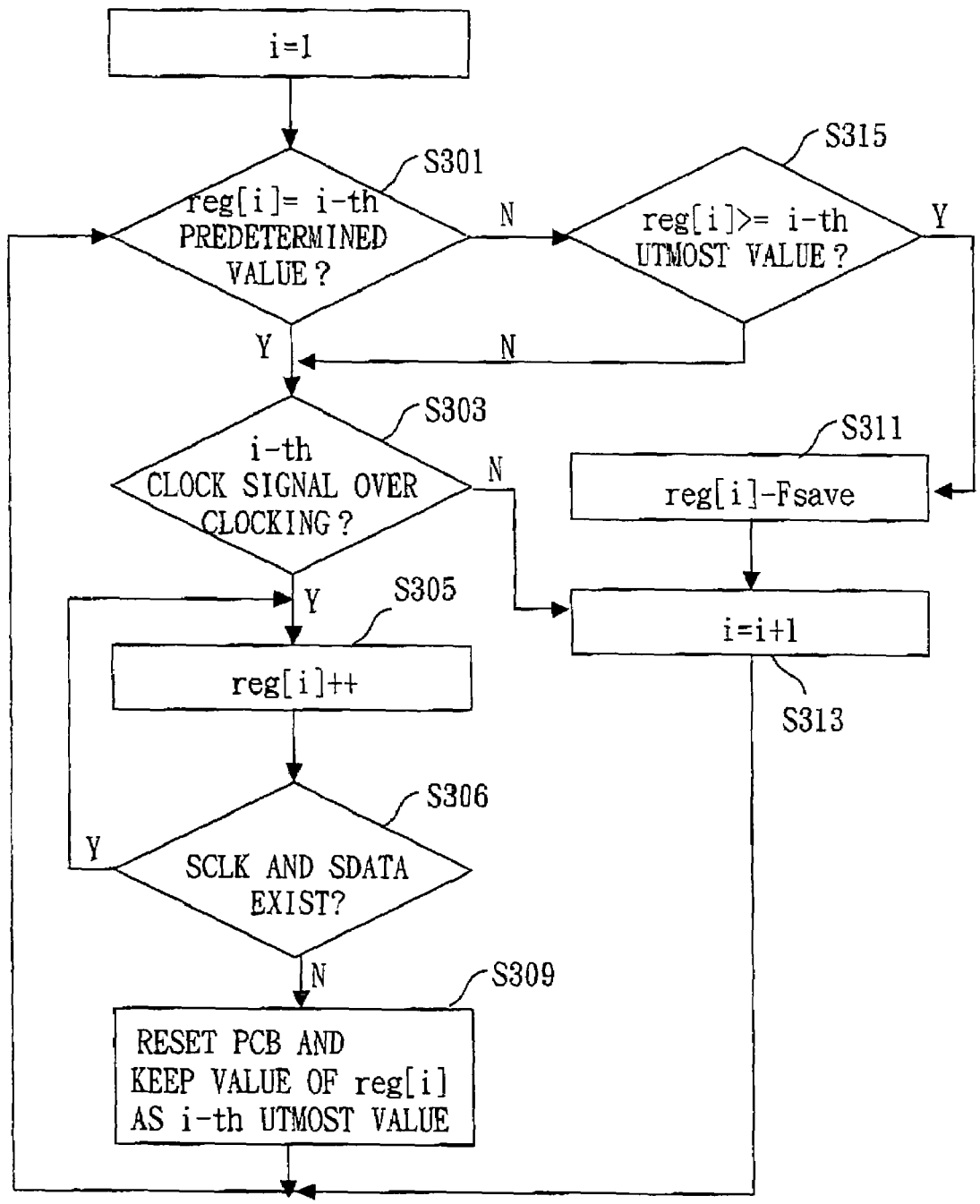
FIG. 3 is a flow chart showing a clock tuning method of an embodiment of the invention.

FIG. 3 is a flow chart showing a clock tuning method according to an embodiment of the invention. As shown in this drawing, the overclocking operation is performed on an element disposed on a printed circuit board (PCB) by tuning an i-th frequency value of the i-th output clock signal of N clock signals, wherein the printed circuit board may be a motherboard and the i-th frequency value may be stored in the i-th register of N registers.

Please refer to FIG. 3. In step S301, it is determined that whether the i-th frequency value of the i-th clock signal stored in the i-th register is equal to a predetermined value (e.g., 100 MHz). If yes, it means that the i-th clock signal has not been overclocked yet, so step S303 is executed. If not, step S315 is executed to determined that whether the i-th frequency value equal to or larger than an i-th utmost frequency value. In step S315, if the i-th frequency value is equal to or larger than a utmost frequency value, step S311 is executed to subtract a dafult value Fsafe from the i-th frequency value, and then step S313 is executed to start performing overclocking operation on the (i+1)-th clock signal. If the i-th frequency value is smaller than the i-th utmost frequency value in step S315, step S303 will then be executed.

In Step 303, it is determined that whether an overclocking operation with respect to the i-th clock signal (e.g., CPU_CLK) is to be executed or not. If yes, step S305 is executed, else step S313 is executed.

In step S305, the i-th frequency value stored in the i-th register is increased by an increment of, for example, 1 MHz, and the frequency of the i-th clock signal (CPU_CLK) is increased according to the i-th frequency value (101 MHz). The increment may be a default value or set by the user. After step S305 is performed, step S306 is executed to detect whether signals generated by a chip such as a south bridge chip exist or not, so as to determine whether at least one of the elements works abnormally. If the signals can't be detected in step S306, it means that at least one of the elements cannot work normally, else the process of the method returns back to step S305 to continually increase the i-th frequency value.

Furthermore, if the signals cannot be detected in step S306, step S309 is executed to keep the i-th frequency value (102 MHz) as the i-th utmost frequency value of the i-th clock signal and generates a reset signal to reset the printed circuit board.

After the reset operation is executed in step S309, the process of the method returns to step S301 and the overclocking operation will be continually executed as described before. That is, in step S301, it is determined that whether the i-th frequency value (102 MHz) stored in the i-th register is equal to the predetermined value (100 MHz). Since the i-th frequency value has been increased in step S305, the i-th frequency value should not be equal to the predetermined value. Thus, step S315 is executed to determined that whether the i-th frequency value equal to or larger than the i-th utmost frequency value (102 MHz). Because the i-th frequency value is recorded as the i-th utmost frequency value in step S309, step S311 is executed after step S315 to decrease the i-th frequency value by the dafult value Fsafe (1 MHz). Then, step S313 is executed to start performing overclocking operation on the (i+1)-th clock signal. As a matter of course, the element corresponding to the i-th clock signal is operated according to the i-th frequency value (101 MHz).

Furthermore, the working frequencies of the elements such as chips, buses, and other electrical elements disposed on the printed circuit board may depend on one another sometimes. So, after each of the clock signals has been overclocked, it is possible to repeat the steps of the method to respectively overclock each of the clock signals again. Furthermore, each of the clock signals may be overclocked according to a sequence and overclocked again according to another sequence. Besides, a specific value may be added to the frequency values of the clock signals after all the clock signals are overclocked, so as to test the highest working frequency of each of the elements.

The invention provides a clock tuning apparatus and the method thereof for respectively performing overclocking operation on each of the elements disposed on a printed circuit board. Hence, each element will be operated according to an optimized frequency. Besides, the invention determines whether an overclocking operation fails or not by detecting at least a signal generated by a circuit coupled to the printed circuit board. Thus, the time for performing overclocking operation could be effectively shortened. It should be noted that the sequence of the method, the way to detect the signal for determining whether an overclocking operation fails or not, and the devices used for achieving the invention are not limited by the above-mentioned embodiments.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A clock tuning method for utilizing a clock generator to execute an overclocking operation on a plurality of elements disposed on a printed circuited board (PCB), the method comprising:
    performing the overclocking operation on one of the elements, comprising:
        increasing a frequency of a clock signal generated by the clock generator to operate the element corresponding to the clock signal;
        repeating the step of increasing the frequency until one of the elements cannot work normally, meanwhile, the frequency is viewed as an utmost frequency of the clock signal;
        resetting all the elements, and operating the element corresponding to the clock signal according to a safe frequency of the clock signal, wherein the safe frequency is lower than the utmost frequency; and
    repeating the step of performing the overclocking operation to perform the overclocking operation on one of the elements that have not been performed overclocking operation.

2. The method of claim 1, wherein the step of increasing the frequency of the clack signal further comprises:
    determining whether each of the elements work normally or not by reading a signal generated by a circuit coupled to the PCB.

3. The method of claim 2, wherein the PCB is a motherboard and the circuit is a south bridge chip.

4. The method of claim 1, wherein the step of increasing the frequency of the clock signal further comprises:
    storing the value of the frequency as the value of the safe frequency if each of the elements work normally after increasing the frequency.

5. The method of claim 1, wherein the step of increasing the frequency of the clock signal further comprises:
    storing the value of the frequency as the value of the utmost frequency if one of the elements cannot work normally after increasing the frequency.

6. The method of claim 1, wherein the step of resetting all the elements further comprises:
    decreasing the utmost frequency, so as to obtain the safe frequency.

7. The method of claim 1, wherein the step of resetting all the elements further comprises:
    if one of the elements cannot work normally according to the safe frequency, decreasing the safe frequency and repeating the step of resetting all the elements.

8. The method of claim 1, wherein the step of repeating the step of performing overclocking operation further comprises:
    repeating the step of performing overclocking operation to perform the overclocking operation on the element that have been performed overclocking operation if a plurality of the elements have been performed the overclocking operation.

9. A clock tuning method for utilizing a clock generator to execute an overclocking operation on at least one of elements disposed on a printed circuited board (PCB), the method comprising:
    performing the overclocking operation on one of the elements, comprising:
        increasing a frequency of a clock signal generated by the clock generator to operate the element corresponding to the clock signal;
        reading a signal generated by a chip coupled to the PCB to determine whether one of the elements works normally or not;
        repeating the step of increasing the frequency and the step of reading the signal until one of the elements cannot work normally, meanwhile, the frequency is viewed as an utmost frequency of the clock signal; and
    resetting all the elements and operating the element corresponding to the clock signal according to a safe frequency of the clock signal, wherein the safe frequency is lower than the utmost frequency;
    wherein the step of resetting all the elements further comprises:
        repeating the step of performing overclocking operation to perform the overclocking operation on the element that have not been performed overclocking operation.

10. The method of claim 9, wherein the step of increasing the frequency of the clock signal further comprises:
    if all the elements work normally after increasing the frequency of the clock signal, storing the value of the frequency as the value of the safe frequency.

11. The method of claim 9, wherein the step of increasing the frequency of the clock signal further comprises:
    if one of the elements cannot work normally after increasing the frequency of the clock signal, storing the value of the increased frequency as the value of the utmost frequency.

12. The method of claim 9, wherein the step of resetting all the elements further comprises:
    decreasing the utmost frequency to obtain the safe frequency.

13. A device for executing an overclocking operation on a plurality of elements disposed on a printed circuit board (PCB), the device comprising:
    a plurality of registers for storing a plurality of values respectively corresponding to frequencies of a plurality of clock signals, the plurality of clock signals being used for operating the plurality of elements, the plurality of registers comprising:

a first register storing a first value for operating a first element among the elements; and a second register storing a second value for operating a second element among the elements;

a clock generator for generating the plurality of clock signals according to the values stored in the plurality of registers; and a control circuit for executing the overclocking operation on the first element and the second element, the control circuit executing the following steps:

executing the overclocking operation on the first element, comprising:

adjusting the first value stored in the first register until detecting/receiving an indication signal representing that one of the elements disposed on the PCB cannot works normally, and thereby determining the first value as a first utmost value corresponding to a first utmost frequency; and updating the first value stored in the first register from the first utmost value to a first safe value corresponding to a first safe frequency, the first safe frequency smaller than the first utmost frequency; and executing the overclocking operation on the second element, comprising:

adjusting the second value stored in the second register until detecting/receiving the indication signal representing that one of the elements disposed on the PCB cannot works normally, and thereby determining the second value as a second utmost value corresponding to a second utmost frequency; and updating the second value stored in the second register from the second utmost value to a second safe value corresponding to a second safe frequency, the second safe frequency smaller than the second utmost frequency.

14. The device of claim 13, wherein the control circuit further executes the following steps:

resetting the PCB after completing the step of adjusting the first value; and resetting the PCB after completing the step of adjusting the second value.

15. The device of claim 13, wherein the control circuit further executes the following steps:

comparing the first value with a first predetermined value, so as to determine whether the first element has been performed overclocking operation; and comparing the second value with a second predetermined value, so as to determine whether the second element has been performed overclocking operation.

16. The device of claim 13, wherein the control circuit determines the first safe value by altering the first utmost value according to a first default value, and determines the second safe value by altering the second utmost value according to the first default value or a second default value.

17. The device of claim 13, wherein the first and second elements are two of a CPU, an AGP and a PCI bus.

18. The device of claim 13, wherein the indication signal is generated by a south bridge chip disposed on the PCB.

19. The device of claim 18, wherein the control circuit further comprises:

a flag or a timer;

wherein the south bridge chip generates the indication signal to read the flag or access the timer.

20. A device for executing an overclocking operation on a plurality of elements disposed on a printed circuit board (PCB), the device comprising:

a plurality of registers for storing a plurality of values respectively corresponding to frequencies of a plurality of clock signals, the plurality of clock signals being used for operating the plurality of elements, the plurality of registers comprising:

a first register storing a first value for operating a first element among the elements; and a second register storing a second value for operating a second element among the elements;

a clock generator for generating the plurality of clock signals according to the values stored in the plurality of registers; and a control circuit for executing the overclocking operation on the first element and the second element, the control circuit executing the following steps:

executing the overclocking operation on the first element, comprising:

adjusting the first value stored in the first register;

monitoring whether one of the elements disposed on the PCB cannot works normally; and when one of the elements disposed on the PCB cannot works normally, determining the first value as a first utmost value corresponding to a first utmost frequency and consequently updating the first value stored in the first register from the first utmost value to a first safe value corresponding to a first safe frequency, the first safe frequency smaller than the first utmost frequency; and executing the overclocking operation on the second element after executing the overclocking operation on the first element, comprising:

adjusting the second value stored in the second register;

monitoring whether one of the elements disposed on the PCB cannot works normally; and when one of the elements disposed on the PCB cannot works normally, determining the second value as a second utmost value corresponding to a second utmost frequency and consequently updating the second value stored in the second register from the second utmost value to a second safe value corresponding to a second safe frequency, the second safe frequency smaller than the second utmost frequency.

* * * * *